United States Patent
Kim et al.

(10) Patent No.: US 8,565,152 B2
(45) Date of Patent: Oct. 22, 2013

(54) DUAL MODE MOBILE TERMINAL IN MIMO WIRELESS COMMUNICATION SYSTEM AND CONTROLLING METHOD THEREOF

(75) Inventors: Muryong Kim, Seoul (KR); Jae Hyuk Jang, Seoul (KR); Chihun Lee, Gwangmyeong-si (KR); Yong-Sang Cho, Seoul (KR); Won yong Yoon, Seoul (KR); Kwangil Kim, Anyang-si (KR)

(73) Assignee: LG Electronics Inc., Seoul (KR)

( * ) Notice: Subject to any disclaimer, the term of this patent is extended or adjusted under 35 U.S.C. 154(b) by 711 days.

(21) Appl. No.: 12/771,060

(22) Filed: Apr. 30, 2010

(65) Prior Publication Data

US 2010/0296419 A1    Nov. 25, 2010

Related U.S. Application Data

(60) Provisional application No. 61/180,136, filed on May 21, 2009.

(51) Int. Cl.
*H04W 4/00* (2009.01)
*H04L 5/00* (2006.01)
*H04B 7/00* (2006.01)
*H04B 7/216* (2006.01)

(52) U.S. Cl.
USPC ........... 370/328; 370/297; 370/310; 370/320; 370/331; 455/436

(58) Field of Classification Search
USPC .................................. 370/299, 297
See application file for complete search history.

(56) References Cited

U.S. PATENT DOCUMENTS

| | | | |
|---|---|---|---|
| 6,804,310 B1 * | 10/2004 | Li et al. .................. | 375/316 |
| 2004/0204035 A1 * | 10/2004 | Raghuram et al. ......... | 455/553.1 |
| 2008/0144581 A1 | 6/2008 | Ishizu et al. ................. | 370/332 |
| 2010/0109778 A1 * | 5/2010 | Ichitsubo et al. ........... | 330/285 |
| 2010/0272004 A1 * | 10/2010 | Maeda et al. ................. | 370/312 |
| 2010/0279709 A1 * | 11/2010 | Shahidi et al. ............ | 455/456.2 |
| 2012/0069758 A1 * | 3/2012 | Kim et al. .................... | 370/252 |
| 2012/0083302 A1 * | 4/2012 | Borran et al. ................ | 455/501 |
| 2012/0287859 A1 * | 11/2012 | Ji et al. ......................... | 370/328 |

FOREIGN PATENT DOCUMENTS

WO    WO 2007/053066 A1    5/2007

OTHER PUBLICATIONS

Context Transfer in the CDMA-LTE inter technology handover by Meghana Sahasrabudhe, Nokia Siemens Networks 2007.*
Chinese Office Action dated Oct. 10, 2012 issued in Application No. 201010178939.9 (with English translation).

* cited by examiner

*Primary Examiner* — Steven H Nguyen
*Assistant Examiner* — Abu-Sayeed Haque
(74) *Attorney, Agent, or Firm* — KED & Associates, LLP (57) ABSTRACT

A dual mode terminal and controlling method thereof are disclosed. The present invention includes a first antenna and a second antenna. In particular, a signal received via the second antenna includes a signal generated from multiplexing an LTE downlink signal, a CDMA DCN (data core network) downlink signal and a CDMA PCS (personal communication services) downlink signal. And, the present invention is characterized in including a triplexer for demultiplexing of the downlink signals. Accordingly, a dual mode terminal of the present invention is able to receive an LTE signal without a data rate fall in the course of measuring a quality of a CDMA signal.

10 Claims, 8 Drawing Sheets

DUAL MODE MOBILE TERMINAL IN MIMO WIRELESS COMMUNICATION SYSTEM AND CONTROLLING METHOD THEREOF

Pursuant to 35 U.S.C. §119(a), this application claims the benefit of earlier filing date and right of priority to U.S. Provisional Application 61/180,136, filed on May 21, 2009, the contents of which are hereby incorporated by reference herein in their entirety.

BACKGROUND OF THE INVENTION

1. Field of the Invention

The present invention relates to a mobile terminal, and more particularly, to a dual mode mobile terminal and controlling method thereof. Although the present invention is suitable for a wide scope of applications, it is particularly suitable for receiving an LTE signal without a data rate fall in the course of measuring a quality of a CDMA signal.

2. Discussion of the Related Art

Generally, a dual mode mobile terminal is a mobile terminal capable of supporting two species of wireless communications differing from each other in communication system. The dual mode mobile terminal is mainly used in an area whether heterogeneous communication networks coexist. As a representative example of the dual mode mobile terminal, a mobile terminal available for both LTE (long term evolution) wireless communication and CDMA (code division multiple access) wireless communication is ongoing to receive wide attention. Although a dual mode mobile terminal capable of communicating with both LTE network and CDMA network are taken as an example for the present invention, it is apparent to those skilled in the art that the present invention is applicable to other species of wireless communication systems.

In the LTE wireless communication, an MIMO scheme for transmitting and receiving signals using a plurality of transmitting antennas and a plurality of receiving antennas is adopted. Once the MIMO scheme is adopted, a transmitting or receiving stage is able to increase capacity and enhance performance using a plurality of antennas. Moreover, the CDMA wireless communication has needed multiple antennas for diversity scheme since EV-DO REV. A. In this disclosure, MIMO can be called 'multiple antennas'.

In order to receive one whole message, MIMO system does not depend on a single antenna path. Instead, in the MIMO system, data is completed by collecting to combine data fragments received via plural antennas together. If the MIMO system is used, it is able to data rate can be improved within a cell area having a specified size. And, it is also able to increase system coverage while securing a specific data rate. Moreover, the MIMO system is widely applicable to a mobile communication terminal, a relay and the like. According to the MIMO system, it is able to overcome the limited transmission traffic in mobile communication of the related art having used a single antenna.

Meanwhile, in a dual mode terminal of the related art, it may cause a problem that transmission/reception of LTE signals is interrupted in a specific situation due to the limitation put on the number of antennas loadable in one terminal device.

Figure 1:
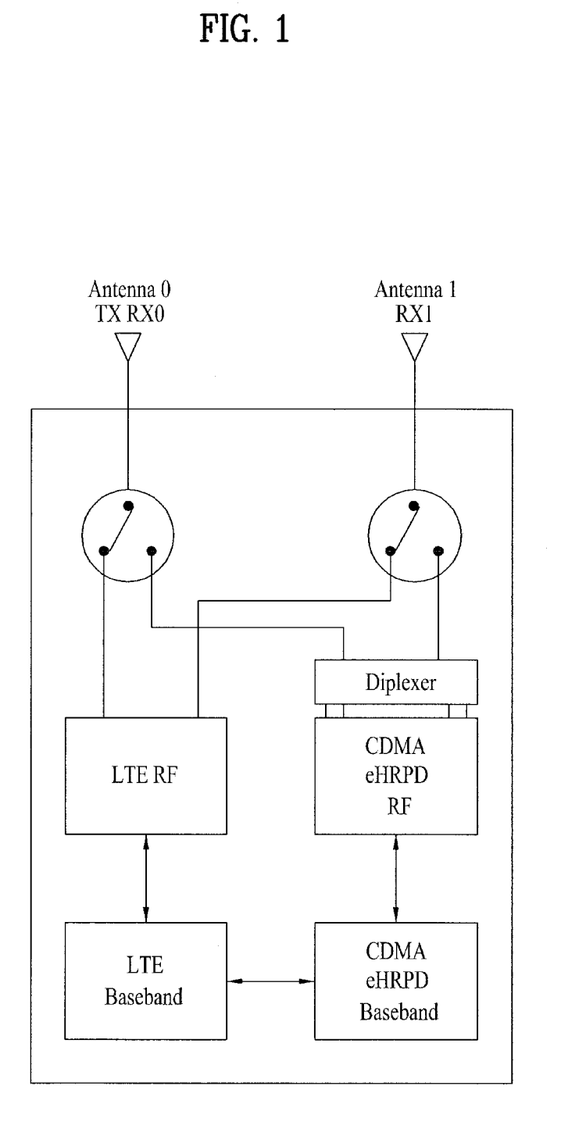
FIG. 1 is a diagram for a structure of a single radio frequency receiver chain-dual mode terminal according to a related art.

FIG. 1 is a diagram for a structure of a single radio frequency receiver chain-dual mode terminal according to a related art.

Referring to FIG. 1, a single radio-dual mode terminal includes an LTE modem and a CDMA modem. And, a diplexer performs multiplexing of DCN (data core network) frequency band and PCS (personal communication service) frequency band and demultiplexing thereof. Moreover, an antenna 0 and an antenna 1 are simultaneously switched between the LTE modem and the CDMA modem.

Figure 2:
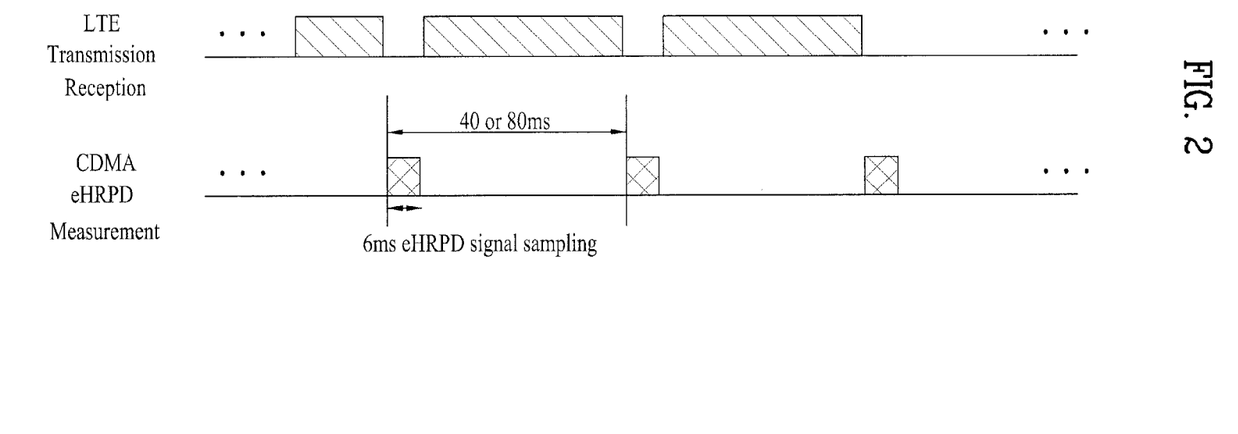
FIG. 2 is a diagram for explaining a problem that may be caused by a general single radio frequency receiver chain-dual mode terminal.

FIG. 2 is a diagram for explaining a problem that may be caused by a general single radio frequency receiver chain-dual mode terminal.

Referring to FIG. 2, in case that a terminal, that is communicating with an LTE network, attempts a handover into a CDMA network, it stops a reception of an LTE signal from an LTE base station (eNodeB) during about 6 ms, as shown in FIG. 2, and then measures a quality of a CDMA signal. The measured quality of the CDMA signal is transmitted to the LTE base station via an LTE modem.

In this case, the quality of the CDMA signal means eHRPD (enhanced high-rate packet data) measurement. Moreover, eHRPD is a new version of 1xEV-DO upper layer protocol stack developed by 3GPP2 Standard committee to prepare for the wireless communication network interoperability with LTE.

An intermediate time of the LTE signal for this quality measurement is called a measurement gap. During this measurement gap, the antenna 0 and the antenna 1 of the dual mode terminal of the related art are connected to the CDMA modem by switching. In particular, this measurement gap means interruption of reception/transmission of LTE signal, which consequently means that frequency efficiency is lowered.

The present invention intends to propose an apparatus for performing CDMA signal quality measurement without generating a measurement gap and method thereof.

SUMMARY OF THE INVENTION

Accordingly, the present invention is directed to a dual mode mobile terminal that substantially obviates one or more problems due to limitations and disadvantages of the related art.

An object of the present invention is to provide a dual mode mobile terminal in an MIMO wireless communication system and controlling method thereof.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a dual mode terminal according to the present invention includes a first communication module configured to communicate with a first base station, a second communication module configured to communicate with a second base station, a first antenna including a switching module connected to either the first communication module or the second communication module, the first antenna configured to transmit/receive either a first base station signal or second base station signals, a second antenna configured to receive the first base station signal and the second base station signals, a diplexer configured to multiplex or demultiplex the second base station signals if the first antenna is connected to the second communication module, and a triplexer configured to demultiplex the first base station signal and the second base station signals.

Preferably, the first communication module receives a command for a second base station signal quality measurement from the first base station and then delivers the received command to the second communication module.

More preferably, the second communication module having received the command performs the second base station signal quality measurement using the second base station signal received via the second antenna. And, the first communication module receives the first base station signal via the first antenna and the second antenna.

Preferably, the first base station includes an LTE (long term evolution) base station and the second base station comprises a CDMA (code division multiple access) base station.

More preferably, the triplexer demultiplexes the signal received via the second antenna into an LTE downlink signal, a CDMA DCN (data core network) downlink signal and a CDMA PCS (personal communication services) downlink signal. In this case, a band of the LTE downlink signal ranges between 746 MHz and 756 MHz and a band of the CDMA DCN downlink signal ranges between 869 MHz and 894 MHz.

More preferably, the diplexer performs multiplexing or demultiplexing of the CDMA DCN downlink signal or the CDMA PCS downlink signal.

Preferably, if the dual mode terminal handed over into the second base station from the first base station, the first antenna is connected to the second communication module.

In another aspect of the present invention, a method of controlling a dual mode terminal in an MIMO wireless communication system includes the steps of receiving an LTE (long term evolution) signal via a first antenna and a second antenna, receiving information indicating that a neighbor CDMA (code divisional multiple access) base station exists from an LTE base station, if a quality of the LTE signal is equal to or smaller than a first threshold, receiving a command for a CDMA signal quality measurement from the LTE base station, receiving a CDMA signal from the neighbor CDMA base station via the second antenna as soon as receiving the LTE signal from the LTE base station via the first antenna and the second antenna, measuring a quality of the received CDMA signal, and reporting the measured quality to the LTE base station.

Preferably, the method further includes the step of if the quality of the LTE signal is equal to or smaller than the first threshold for a specific duration and the quality of the CDMA signal is equal to or greater than a second threshold, performing a handover into the neighbor CDMA base station from the LTE base station.

More preferably, the handover performing step includes the step of connecting the first antenna to a CDMA modem from an LTE modem.

Preferably, the signal received via the second antenna includes a signal generated from multiplexing an LTE downlink signal, a CDMA DCN (data core network) downlink signal and a CDMA PCS (personal communication services) downlink signal.

Preferably, a band of the LTE downlink signal ranges between 746 MHz and 756 MHz and a band of the CDMA DCN downlink signal ranges between 869 MHz and 894 MHz.

Accordingly, the present invention provides the following effects and/or advantages.

First of all, in an MIMO wireless communication system, a dual mode terminal is able to effectively perform measurement of a CDMA signal quality by keeping receiving LTE signals without a measurement gap.

Secondly, a dual mode terminal of the present invention is able to receive an LTE signal without a data rate fall in the course of measuring a CDMA signal quality.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE INVENTION

Reference will now be made in detail to the preferred embodiments of the present invention, examples of which are illustrated in the accompanying drawings. Detailed descriptions disclosed in the following with reference to the accompanying drawings are intended not to indicate the only embodiment of the present invention but to explain exemplary embodiments of the present invention. In the following detailed description of the invention, details are included to help the full understanding of the present invention. Yet, it is apparent to those skilled in the art that the present invention can be implemented without these details. For instance, although the following descriptions are made in detail on the assumption that a wireless mobile communication system includes 3GPP LTE system, they are applicable to other mobile communication systems except intrinsic features of the 3GPP LTE.

Occasionally, to prevent the present invention from getting vaguer, structures and/or devices known to the public are skipped or can be represented as block diagrams centering on the core functions of the structures and/or devices. Wherever possible, the same reference numbers will be used throughout the drawings to refer to the same or like parts.

Besides, in the following description, assume that a terminal is a common name of such a mobile or fixed user stage device as a user equipment (UE), a mobile station (MS) and the like and that a base station is a common name of such a random node of a network stage communicating with a terminal as a node B, eNode B, a base station and the like.

Figure 3:
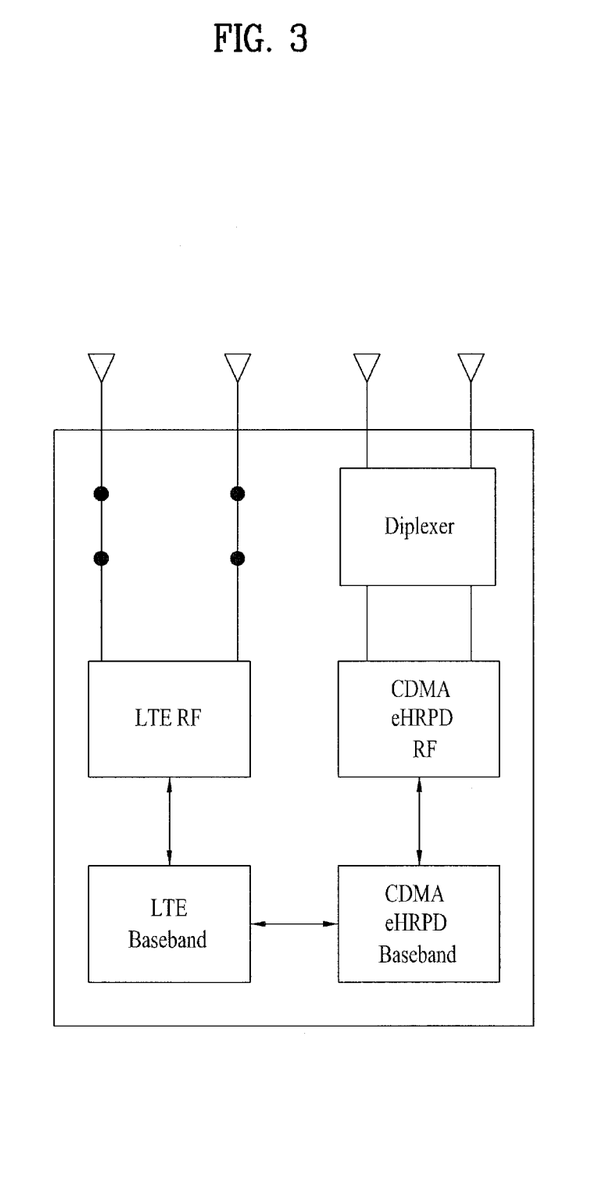
FIG. 3 is a diagram for a structure of a dual radio frequency receiver chain-dual mode terminal according to a related art.
Figure 4:
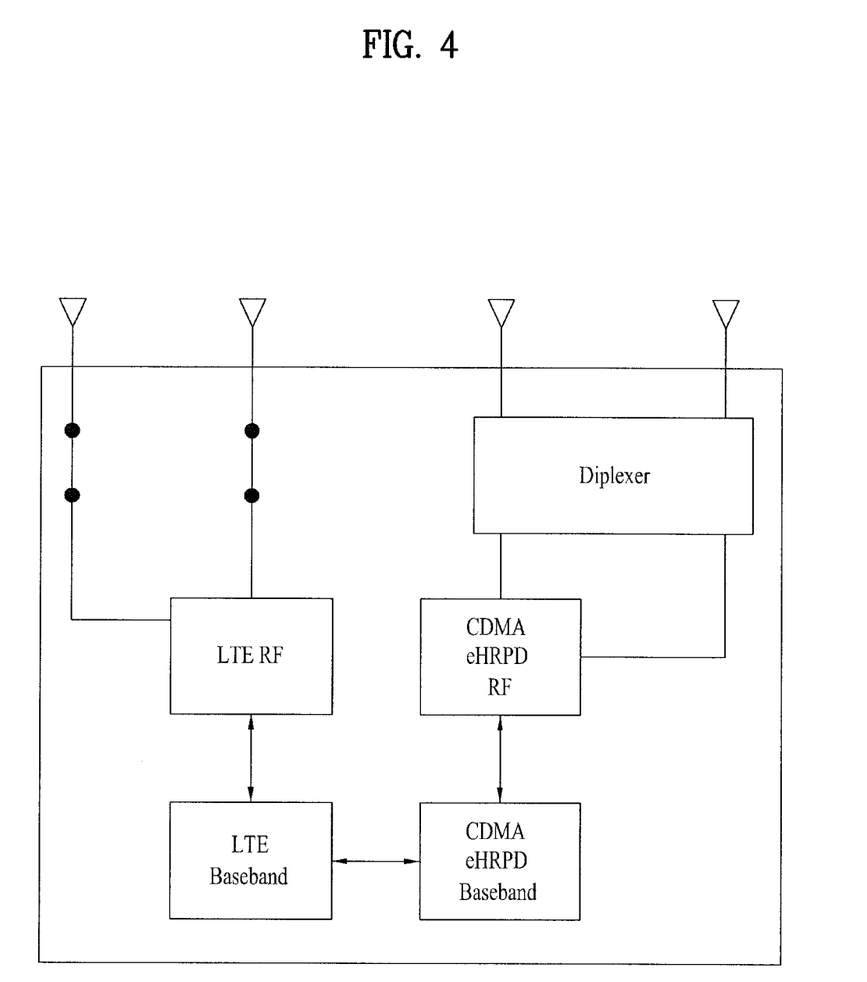
FIG. 4 is a diagram for a structure of a dual radio frequency receiver chain-dual mode terminal that supplements the problems of the former terminal shown in FIG. 3.
Figure 5:
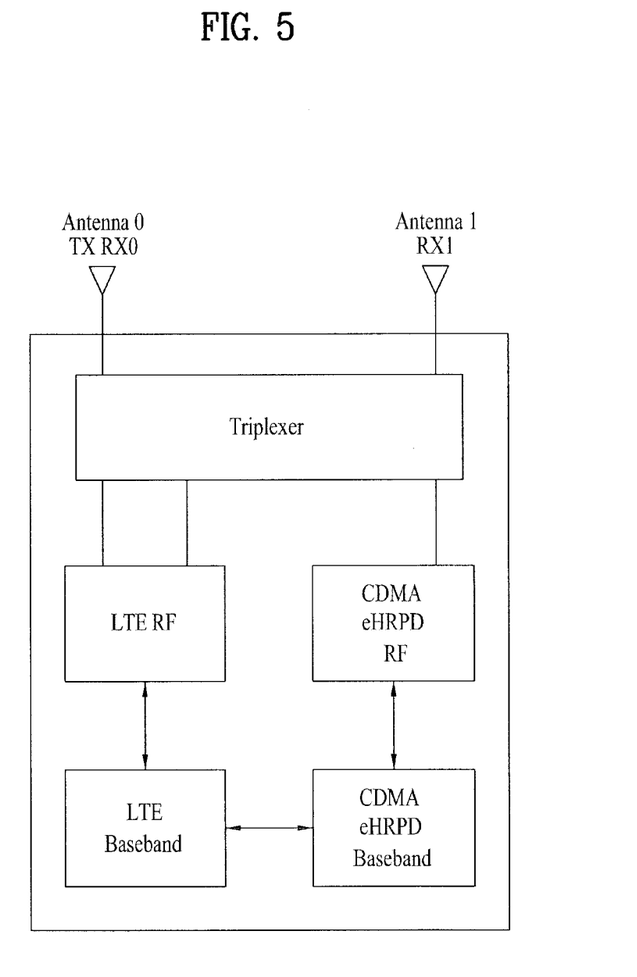
FIG. 5 is a diagram for another structure of a dual radio frequency receiver chain-dual mode terminal according to a related art.

In order to solve the above described problems, advantages and disadvantages of the related arts are described as follows. First of all, a structure of a terminal shown in the following was proposed to perform a quality measurement of CDMA signal by avoiding the generation of a measurement gap. Particularly, since diversity antennas are supported over CDMA EVDO rev. A, two antennas for transmission/reception of CDMA signal are shown in FIGS. 3 to 5. Yet, it should be noted that one antenna is provided for a quality measurement of CDMA signal only.

FIG. 3 is a diagram for a structure of a dual radio frequency receiver chain-dual mode terminal according to a related art.

Referring to FIG. 3, in order to block any generation of a measurement gap, it can be observed that an antenna for transceiving LTE signals and an antenna for transceiving CDMA signals separately exist. Particularly, the diplexer in FIG. 2 is provided to perform multiplexing of DCN (data core network) frequency band and PCS (personal communication service) frequency band and demultiplexing thereof.

Since a quality measurement of CDMA signal is performed without depending on transmission/reception of LTE signal, a measurement gap is not generated. Yet, as a number of antennas are loaded in a limited space of a terminal device, it causes a problem that inter-antenna interference increases.

FIG. 4 is a diagram for a structure of a dual radio frequency receiver chain-dual mode terminal that supplements the problems of the former terminal shown in FIG. 3. In FIG. 4, a diplexer is also provided to perform multiplexing of DCN (data core network) frequency band and PCS (personal communication service) frequency band and demultiplexing thereof.

Referring to FIG. 4, although probability of generation of inter-antenna interference is lowered by increasing a size of the terminal device shown in FIG. 2, it is insufficient to satisfy a demand made by a terminal manufacturer in aspect of design.

FIG. 5 is a diagram for another structure of a dual radio frequency receiver chain-dual mode terminal according to a related art. Particularly, the terminal shown in FIG. 5 is characterized in adopting a triplexer for performing multiplexing and demultiplexing of LTE frequency band, CDMA DCN frequency band and CDMA PCS frequency band. In this case, a high-precision triplexer should be capable of precisely discriminating an uplink frequency band of CDMA DCN and an LTE downlink frequency band from each other.

Figure 6:
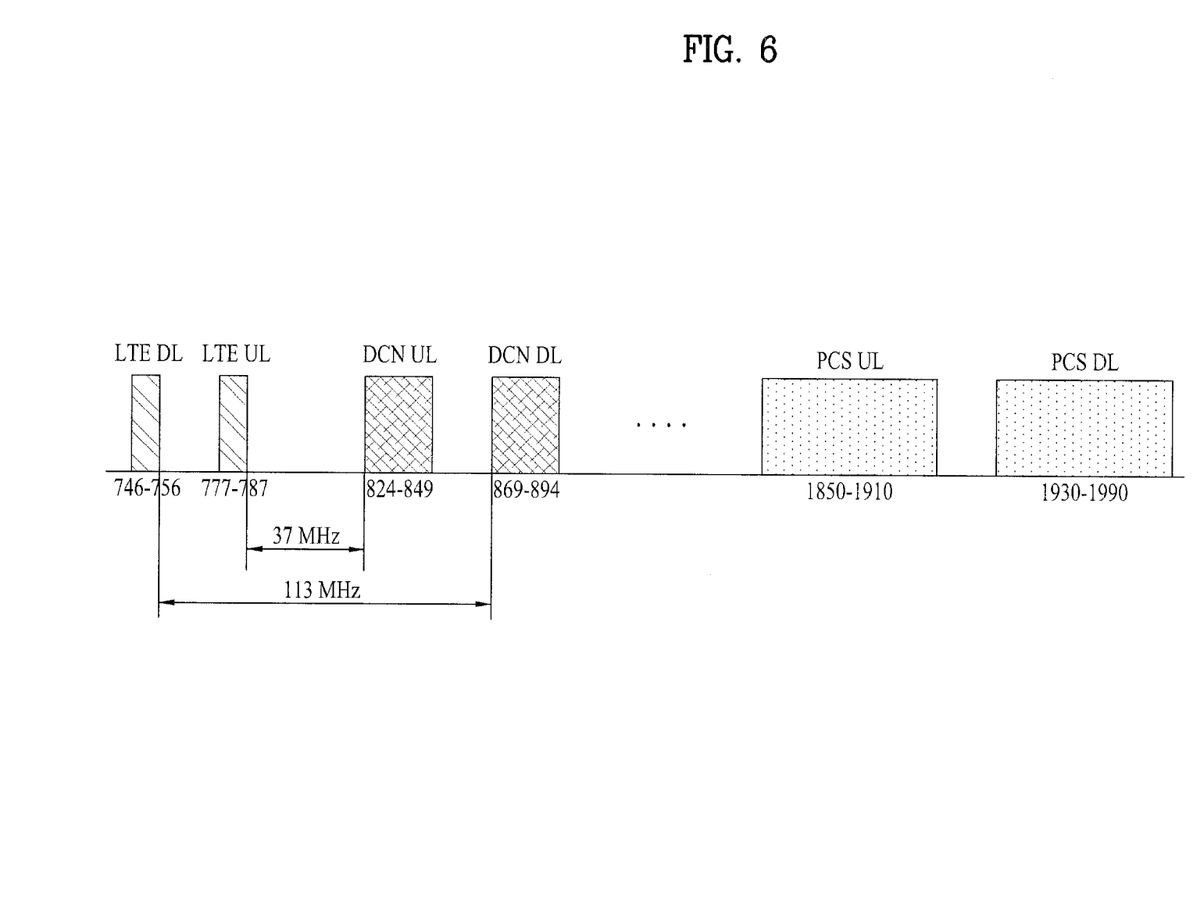
FIG. 6 is a diagram of frequency bandwidths serviced by Verizon Communications, U.S.A.

However, since a gap between a CDMA DCN (data core network) UL (uplink) band and an LTE UL band by Verizon Communications, U.S.A., as shown in FIG. 6, is narrowly set to 37 MHz, it is considerably difficult for a current technology to implement a high-precision triplexer capable of discriminating a CDMA DCN UL frequency band and an LTE UL frequency band from each other. Even if the implementation of the high-precision combiner/splitter is possible, the product cost will not be realistic.

Accordingly, the present invention proposes a dual mode terminal for performing a measurement of CDMA signal without affecting reception performance of LTE signals by avoiding the generation of the problems caused by the related art dual mode terminal.

Figure 7:
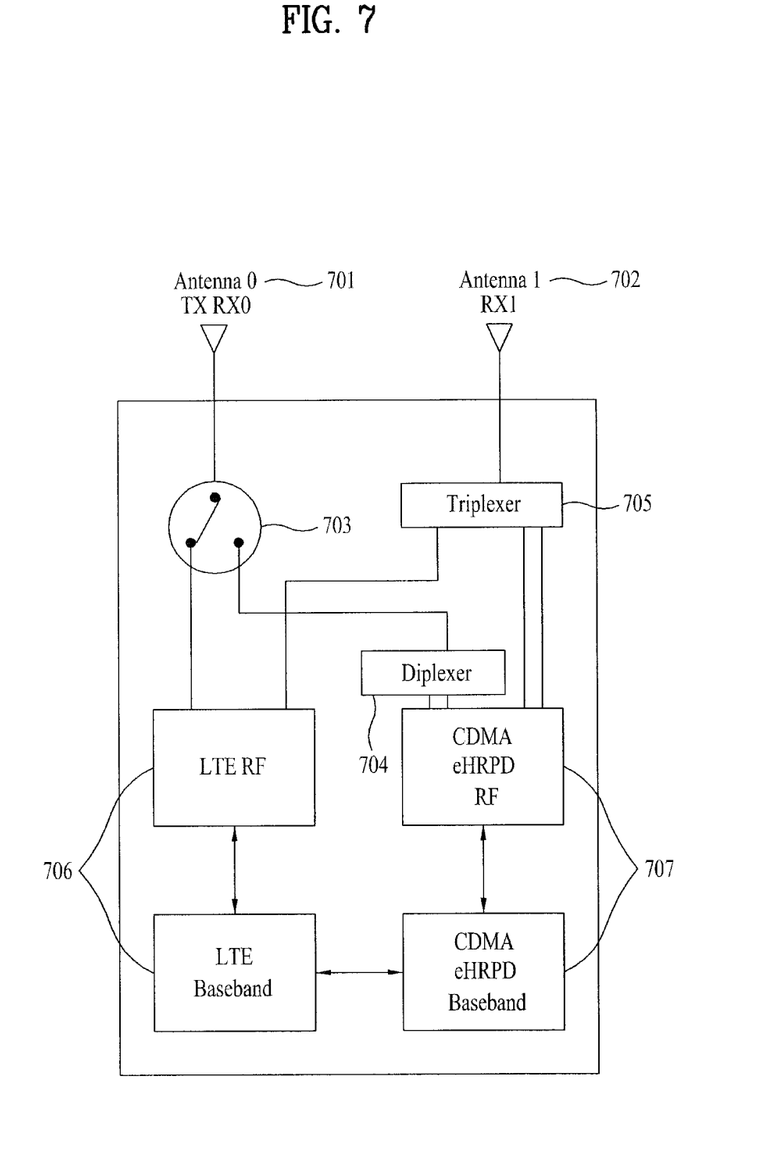
FIG. 7 is a diagram for a structure of a dual radio frequency receiver chain-dual mode terminal according to an embodiment of the present invention.

FIG. 7 is a diagram for a structure of a dual radio frequency receiver chain-dual mode terminal according to an embodiment of the present invention.

Referring to FIG. 7, an antenna 0 701 is an antenna for both transmitting and receiving. And, it is able to perform transmission/reception of LTE signals or CDMA signals using a switch 703. The dual radio frequency receiver chain-dual mode terminal shown in FIG. 7 differs from the related art dual mode terminal shown in FIG. 1 in that switching is performed only if an LTE modem 706 does not work due to handover made into a CDMA network. In case that the antenna 0 is connected to a CDMA modem 707 via the switch 703, a diplexer 704 is able to perform multiplexing or demultiplexing of two CDMA frequency bands (i.e., DCN and PCS).

An antenna 1 702 is a receiving-only antenna. A triplexer 705 connected to the antenna 1 702 is able to perform demultiplexing of all LTE downlink bands and CDMA downlink bands. This triplexer differs from the former triplexer shown in FIG. 4 in that the demultiplexing of downlink signals is performed only.

In particular, a gap between DCN DL band and LTE DL band, as shown in FIG. 5, is set to 113 MHz and can be easily discriminated unlike the uplink band (e.g., filtering). It is facilitated to implement the triplexer 705 shown in FIG. 7. And, it is advantageous in that a product cost of the triplexer 705 is realistic.

The dual mode terminal of the present invention shown in FIG. 7 is able to receive LTE DL signals via the antenna 0 701 and the antenna 1 702 for a CDMA measurement period. Yet, it is able to perform a CDMA signal quality measurement by receiving a CDMA signal via the antenna 1 702. Thus, the measured CDMA signal quality is reported to an LTE base station using the antenna 0 701 that is a transmitting antenna.

Figure 8:
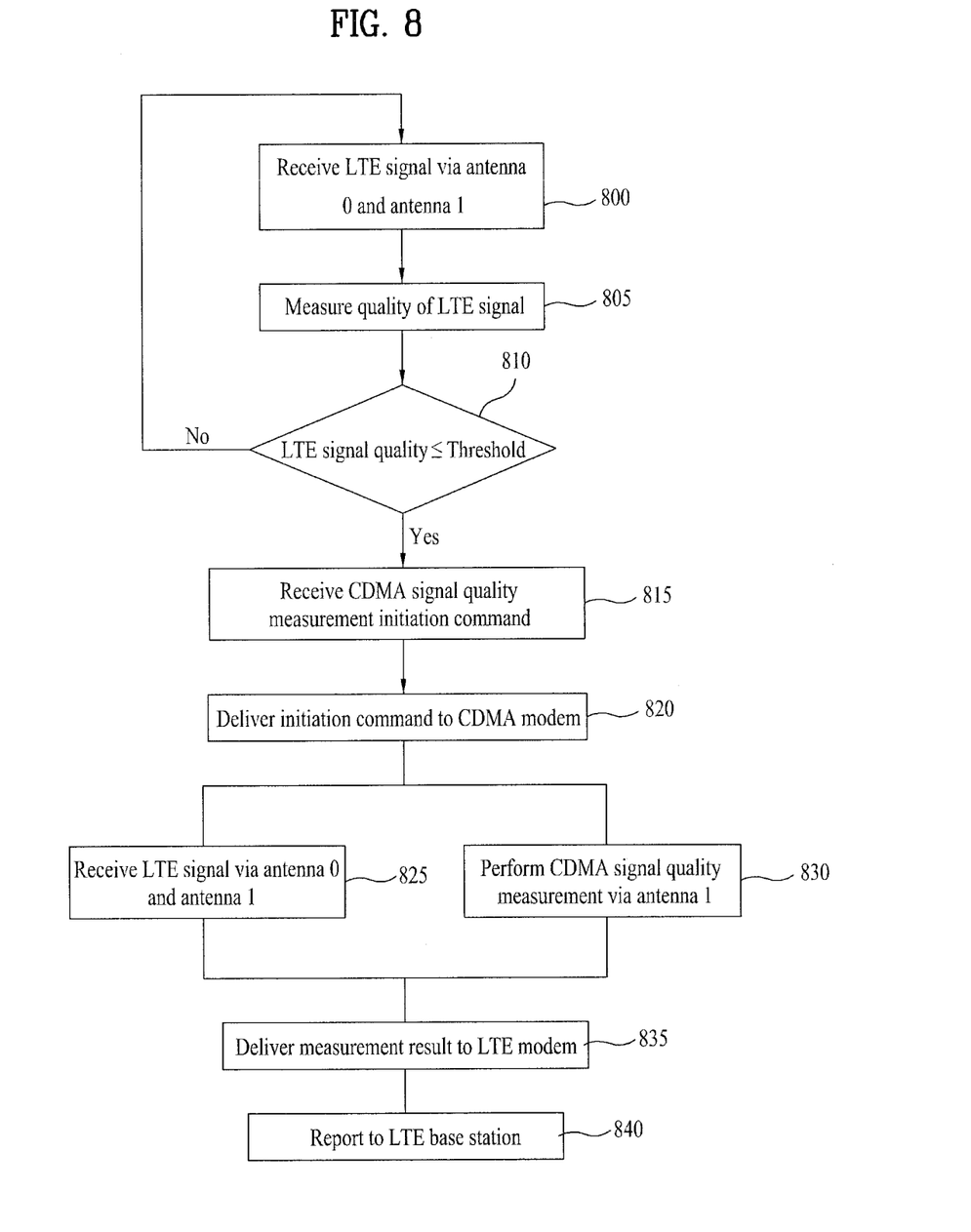
FIG. 8 is a flowchart for explaining an operating process of a dual mode terminal according to an embodiment of the present invention.

FIG. 8 is a flowchart for explaining an operating process of a dual mode terminal according to an embodiment of the present invention. Particularly, FIG. 8 shows an operating process in a situation that a terminal connected to an LTE network measures a CDMA signal to make a handover into a CDMA network.

Referring to FIG. 8, in a step 800, a terminal receives LTE signals via both of the antenna 0 and the antenna 1. The terminal periodically or non-periodically receives information indicating that at least one CDMA cell exists around via a system information block 8 (SIB 8) from an LTE base station. The LTE modem preferably delivers this information to the CDMA modem. Moreover, in a step 805, the terminal periodically or non-periodically performs such an LTE signal quality measuring process as an RSRP (reference signal receiving power) measurement.

In a step 810, the terminal determines whether the measured quality of the LTE signal has a value smaller than a first threshold for a specific duration. If the value is equal to or greater than the threshold, the terminal goes back to the step 800 and then receives LTE signals via both of the antenna 0 and the antenna 1.

In a step 815, if the value is smaller than the threshold, the LTE modem receives a command for initiating a CDMA signal quality measurement via an upper layer, e.g., an RRC (radio resource control) layer from the LTE base station. In a step 820, the LTE modem then delivers the command for initiating the CDMA signal quality measurement to the CDMA modem. Subsequently, the LTE modem keeps receiving LTE signals via the antenna 0 and the antenna 1. Simultaneously, in a step 830, the CDMA modem performs a CDMA signal quality measurement using a CDMA signal received via the triplexer of the antenna 1.

In a step 835, if the CDMA signal quality measurement is completed, the CDMA modem delivers the measurement result to the LTE modem. In a step 840, the LTE modem performs proper transformation on the measurement result and then reports it to the LTE base station via the antenna 0.

Based on the CDMA signal quality measurement and the LTE signal quality measurement result, e.g., if the LTE signal quality is equal to or smaller than a first threshold for a specific period of time and the CDMA signal quality is equal to or greater than a second threshold, the terminal performs a handover into a CDMA base station from the LTE base station. In doing so, the LTE modem enters an idle mode and the antenna 0 is connected to the CDMA modem.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A dual mode terminal:
   a first communication module configured to communicate with a first base station supporting a first protocol;
   a second communication module configured to communicate with a second base station supporting a second protocol;
   a first antenna including a switching module connected to either the first communication module or the second communication module, the first antenna configured to transmit/receive either a first base station signal or second base station signals;
   a second antenna configured to receive the first base station signal and the second base station signals;
   a diplexer configured to multiplex or demultiplex the second base station signals received via the first antenna if the first antenna is connected to the second communication module; and
   a triplexer configured to demultiplex the first base station signal and the second base station signals received via the second antenna, wherein if the dual mode terminal is handed over into the second base station from the first base station, the first antenna is connected to second communication module via the diplexer, and
   wherein the handover is performed from a neighboring LTE base station to a CDMA base station and if a quality of an LTE signal is equal to or smaller than a first threshold for a specific duration and the quality of a CDMA signal is equal to or greater than a second threshold, performing the handover into the neighbor CDMA base station from the LTE base station, wherein the handover includes connecting the first antenna to a CDMA modem from an LTE modem via the diplexer configured to multiplex or demultiplex the second base station signals received via the first antenna.

2. The dual mode terminal of claim 1, wherein the first communication module receives a command for a second base station signal quality measurement from the first base station and then delivers the received command to the second communication module.

3. The dual mode terminal of claim 2, wherein the second communication module having received the command performs the second base station signal quality measurement using the second base station signal received via the second antenna and wherein the first communication module receives the first base station signal via the first antenna and the second antenna.

4. The dual mode terminal of claim 1, wherein the first protocol comprises an LTE (long term evolution) base station and wherein the second protocol comprises a CDMA (code division multiple access) base station.

5. The dual mode terminal of claim 4, wherein the triplexer demultiplexes the signal received via the second antenna into an LTE downlink signal, a CDMA DCN (data core network) downlink signal and a CDMA PCS (personal communication services) downlink signal.

6. The dual mode terminal of claim 5, wherein a band of the LTE downlink signal ranges between 746 MHz and 756 MHz and wherein a band of the CDMA DCN downlink signal ranges between 869 MHz and 894 MHz.

7. The dual mode terminal of claim 4, wherein the diplexer performs multiplexing or demultiplexing of the CDMA DCN downlink signal or the CDMA PCS downlink signal.

8. A method of controlling a dual mode terminal in an MIMO wireless communication system, comprising the steps of:
   receiving an LTE (long term evolution) signal via both a first antenna and a second antenna;
   receiving information indicating that a neighbor CDMA (code divisional multiple access) base station exists from an LTE base station;
   if a quality of the LTE signal is equal to or smaller than a first threshold, receiving a command for a CDMA signal quality measurement from the LTE base station;
   receiving a CDMA signal from the neighbor CDMA base station via the second antenna as soon as receiving the LTE signal from the LTE base station via the first antenna and the second antenna;
   measuring a quality of the received CDMA signal;
   reporting the measured quality to the LTE base station; and
   if the quality of the LTE signal is equal to or less than the first threshold for a specific duration and the quality of the CDMA signal is equal to or greater than a second threshold, performing a handover into the neighbor CDMA base station from the LTE base station,
   wherein the handover performing step includes the step of connecting the first antenna to a CDMA modem from an LTE modem via a diplexer configured to multiplex or demultiplex the second base station signals received via the first antenna.

9. The method of claim 8, wherein the signal received via the second antenna includes a signal generated from multiplexing an LTE downlink signal, a CDMA DCN (data core network) downlink signal and a CDMA PCS (personal communication services) downlink signal.

10. The method of claim 8, wherein a band of the LTE downlink signal ranges between 746 MHz and 756 MHz and wherein a band of the CDMA DCN downlink signal ranges between 869 MHz and 894 MHz.

* * * * *